Patented Sept. 24, 1940

2,215,569

UNITED STATES PATENT OFFICE 2,215,569

TREATMENT OF ARYL SUBSTITUTED MONO-OLEFINS

Herbert Muggleton Stanley, Tadworth, and John Blair Dymock, Tonbridge, Kent, England No Drawing. Application March 17, 1938, Serial No. 196,540. In Great Britain April 1, 1937

3 Claims. (Cl. 260—669)

The present invention relates to the treatment of aryl substituted mono-olefins and derivatives thereof and particularly to the treatment of mixtures of styrene and α-alkyl styrenes. In the production of styrene, e. g. from isopropyl benzene, certain amounts of α-methyl styrene are always produced, and it is desirable for some purposes that the styrene should be freed from α-methyl styrene.

According to the present invention mixtures of styrene and α-alkyl styrenes are subjected to polymerisation conditions such that the α-alkyl styrenes are converted to polymers whereas the styrene remains unchanged. Particularly a mixture of styrene and α-alkyl styrenes is treated with sulphuric acid at about 70% to 90% strength at ordinary temperature so as to effect the polymerisation of the α-alkyl styrenes. Polymerisation may be effected with or without the presence of a solvent or a diluent such as isopropyl benzene. After treatment the unchanged styrene may be recovered from the polymerised substituted styrenes by any known means such as by steam distillation or distillation under reduced pressure.

The following examples illustrate the procedure for carrying out the invention and the results obtained:

Example 1

A hydrocarbon mixture consisting of 26 per cent of styrene, 17 per cent of α-methylstyrene and the remaining percentage of isopropylbenzene was shaken with half its weight of sulphuric acid of 70 per cent strength for 2 hours, the temperature being maintained at about 20° C. by external cooling. The hydrocarbon product, after standing and separation of the aqueous acid layer, was washed successively with water, then with aqueous alkali, and finally with water, and was then distilled under reduced pressure to yield:

I. A distillate containing 90% of the styrene originally present in the mixture as well as the isopropylbenzene and only a small amount of α-methylstyrene, and II. A water-white oily residue consisting mainly of lower polymers of α-methylstyrene.

Example 2

A hydrocarbon mixture consisting of 25 parts by weight of styrene, 25 parts of α-methyl styrene, and 50 parts of isopropyl benzene was treated with 10 parts by weight of 70% sulphuric acid at 20° C. for three to four hours, the mixture being kept agitated. The hydrocarbon product was then allowed to stand and was treated as in Example 1.

The polymers of α-alkyl styrenes produced and isolated as above described may be used in several ways. They may for instance be subjected to a heat treatment whereby they are depolymerised and may be returned to the cracking cycle for the production of styrene from isopropyl benzene. As the reaction

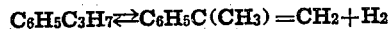

is a reversible reaction the presence of the reaction product, methyl styrene, in the reacting gases inhibits the formation of further methyl styrene, and more of the desired product styrene is produced according to the reaction.

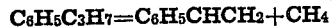

However, a particularly important industrial application for the said polymers is as plasticisers for coumarone resins and styrene resins. In the case of styrene resins it is known that polystyrene of itself possesses a low electrical power factor rendering it very desirable as electrical insulating material but that it has the drawback of being brittle.

In order to overcome or minimise the objectionable brittleness of polystyrene it has been proposed to add plasticisers such as diphenyl phosphate, dibutyl phthalate, chlorinated naphthalenes and alkyl or aralkyl polynuclear hydrocarbons, but most plasticisers have the disadvantage of greatly raising the power factor of the polystyrene.

The polymers of α-alkyl styrenes, however, as produced according to the present invention are free from the aforesaid disadvantage when used as plasticisers for polystyrene. For instance the polymer product of Example 1 above is a good plasticiser for hydrocarbon resins such as polystyrene and polyindene and has very good electrical insulating characteristics. For example the power factor of this polymer product at 17° C. is as low as 0.0002 while even at 100° C. the power factor is still quite low, namely 0.005.

What we claim is:

1. The production of styrene-free polymers of α-alkyl styrenes from a mixture of styrene and α-alkyl styrenes consisting in subjecting the mixture to the selective polymerising action of sulphuric acid of from 70 to 90 per cent strength at ordinary temperature whereby the α-alkyl styrene is polymerised leaving the styrene substantially unchanged, and then separating out the polymer.

2. The production of styrene-free polymers of α-alkyl styrenes consisting in subjecting a mixture of styrene and the α-alkyl styrenes in the presence of isopropyl benzene as diluent to the selective polymerising action of sulphuric acid of from 70 to 90 per cent strength at ordinary temperature and then separating out the polymer.

3. A method of separating styrene from mixtures containing styrene and α-alkyl styrenes which consists in subjecting said mixture to the selective polymerising action of 70–90% sulphuric acid at ordinary temperatures and thereafter separating the unchanged styrene from the polymerised α-alkyl styrene.

HERBERT MUGGLETON STANLEY.
JOHN BLAIR DYMOCK.